United States Patent [19]

Philippe

[11] Patent Number: 4,850,046

[45] Date of Patent: Jul. 18, 1989

[54] INFRARED TRANSMITTER OF CODED MESSAGE HAVING FIXED CODE AND LARGE NUMBER OF COMBINATIONS

[75] Inventor: Patrick Philippe, Jambville, France

[73] Assignee: Neiman, Courbevoie, France

[21] Appl. No.: 113,826

[22] Filed: Oct. 29, 1987

[30] Foreign Application Priority Data

Oct. 30, 1986 [FR] France ................................ 86 15110

[51] Int. Cl.[4] ................................................ H04B 9/00

[52] U.S. Cl. .................................... 455/608; 455/619

[58] Field of Search ............... 455/603, 608, 617, 618; 340/825.54, 825.56, 825.04, 825.06; 358/194.1

[56] References Cited

U.S. PATENT DOCUMENTS 4,628,541 12/1986 Beavers .............................. 455/603

4,665,397 5/1987 Pinnon ........................... 340/825.72

4,703,450 10/1987 Sueyoshi et al. .................... 455/603

FOREIGN PATENT DOCUMENTS 0027900 3/1978 Japan .................................. 455/608

*Primary Examiner*—Robert L. Griffin

*Assistant Examiner*—Leslie Van Beek

*Attorney, Agent, or Firm*—James Creighton Wray

[57] ABSTRACT

An infrared transmitter of coded message is provided having a fixed code and large number of combinations particularly but not solely for use in the automobile industry.

The transmitter comprises a series programmable electronic memory (1), the content of which is addressed by a pulse transmitter (2), an oscillator or timer, the content of the memory (1) being supplied to a pulse generator (3) supplying an amplifier (4), the output of which is transmitted to a transmitter diode (5), the content of the memory (1) being supplied, in addition, to an end of message blocking device (6) controlling the reading pulse transmitter (2).

1 Claim, 1 Drawing Sheet

FIG. 1
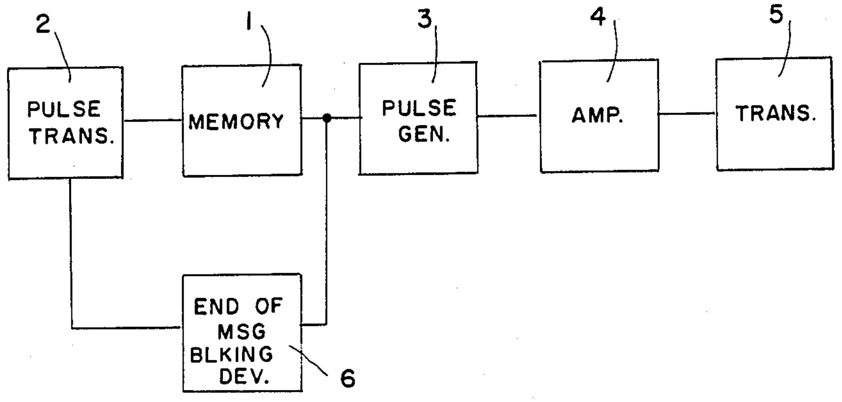
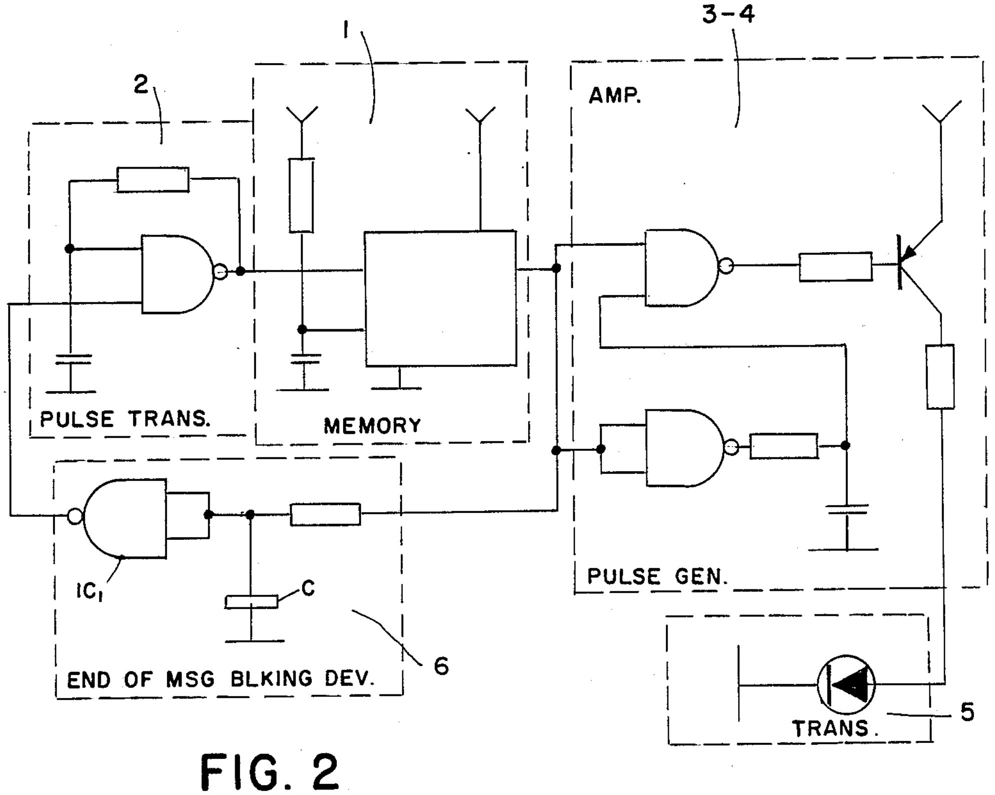
FIG. 2

INFRARED TRANSMITTER OF CODED MESSAGE HAVING FIXED CODE AND LARGE NUMBER OF COMBINATIONS

BACKGROUND OF THE INVENTION

This invention relates to an infrared transmitter of coded message having a fixed code and large number of combinations.

Coded message transmitters are used, for example, for the remote control of security systems, in particular in the automobile industry. The coding of these transmitters is, as a rule, effected by cutting certain transmission paths of a circuit. This mechanical coding, which is visible, is easy to read visually, and in addition, the number of combinations is limited.

OBJECT OF THE INVENTION

An object of the present invention is to eliminate these disadvantages of the known transmitters.

SUMMARY OF THE INVENTION

According to this invention an infrared transmitter comprises a series programmable electronic memory, the content of which is addressed by a pulse transmitter, oscillator or timer, the content of the memory being fed to a pulse generator supplying an amplifier, the output from which is fed to a transmitter diode, the content of the memory being fed also to an end of message blocking device controlling the reading pulse transmitter.

In the transmitters according to this invention, the code is contained in an electronic programmable memory, that is to say this code cannot be read visually. In addition, the number of combinations depends only upon the capacity of the memory used.

BRIEF DESCRIPTION OF DRAWINGS

The invention will be better understood from reading the following description, prepared with reference to the attached drawing, in which:

FIG. 1 is a block diagram of a transmitter according to this invention, and

FIG. 2 is an electronic circuit of the transmitter of FIG. 1, for one example of embodiment.

DESCRIPTION OF PREFERRED EMBODIMENT

The device comprises a memory 1 of the series programmable type, reading of which is controlled by the pulses transmitted by a reading pulse transmitter 2, an oscillator or timer. The content of the memory 1 is fed to a pulse generator 3. The generator 3 supplies an amplifier 4, which supplies a transmitter diode 5. The content of the memory 1 is supplied also to an end of message blocking device 6, which controls the transmitter 2.

For defining one transmitted bit, 8 memory bits are used. The transmitted bit comprises one synchronization bit and one data bit 0 to 1. For blocking the system at the end of transmission, the last bit transmitted (comprising 8 bits) has all its bits positioned at 1, which enables the capacitor C (FIG. 2) of the blocking device 6 to be sufficiently charged for the voltage at the input to the gate $IC_1$ to cause this gate to flip and block the oscillator 2. The system will not be able to transmit again until its supply has been cut or the capacitor C has been discharged, depending upon the type of memory used.

I claim:

1. An infrared transmitter of coded message having a fixed code set therein, comprising, a series programmable electronic memory, the content of which is addressed by a reading pulse transmitter, the content of the memory being supplied to pulse generator supplying an amplifier, the output from which is supplied to a transmitter diode, the content of the memory being supplied, in addition to an end of message blocking device controlling the reading pulse transmitter, wherein the blocking device comprises a gate which is supplied from a capacitor which is supplied via a resistor, and the transmitted message is terminated by a series of binary 1 bits which cause the capacitor to charge, thus causing the gate to flip and block the pulse transmitter.

* * * * *